United States Patent [19]

Jennings

[11] Patent Number: 4,893,732
[45] Date of Patent: Jan. 16, 1990

[54] EXACT VOLUME DISPENSING CONTAINER

[75] Inventor: J. T. Jennings, Mountainside, N.J.

[73] Assignee: Container Mfg. Inc., Middlesex, N.J.

[21] Appl. No.: 364,180

[22] Filed: Jun. 12, 1989

[51] Int. Cl.⁴ .................................................. G01F 11/26
[52] U.S. Cl. ..................................... 222/109; 222/158; 222/456; 222/475
[58] Field of Search ........ 222/109, 158, 437, 454–457, 222/475

[56] References Cited

U.S. PATENT DOCUMENTS

| | | | |
|---|---|---|---|
| 570,759 | 11/1896 | Law | 222/456 |
| 845,175 | 2/1907 | Hutchins | 222/456 X |
| 856,543 | 6/1907 | Nolan | 222/456 |
| 1,066,127 | 7/1913 | Lewis | 222/455 |
| 2,204,104 | 6/1940 | Masters | 222/456 |
| 2,370,820 | 3/1945 | Stott | 222/456 |
| 2,790,581 | 4/1957 | Harter | 222/455 |
| 2,977,028 | 3/1961 | Joffe | 222/454 X |
| 3,396,875 | 8/1968 | Finch | 222/456 |
| 4,666,065 | 5/1987 | Ohren | 222/109 |

FOREIGN PATENT DOCUMENTS

| | | | |
|---|---|---|---|
| 2802210 | 7/1979 | Fed. Rep. of Germany | 222/456 |
| 2601652 | 1/1988 | France | 222/454 |
| 2116522 | 9/1983 | United Kingdom | 222/454 |

*Primary Examiner*—Kevin P. Shaver
*Attorney, Agent, or Firm*—Martha G. Pugh

[57] ABSTRACT

This is an exact volume dispensing container which comprises a primary storage container for storing liquid and a measuring head having a pour-out spout disposed above the primary storage container, a neck disposed between the primary storage container and the measuring head wherein a modified pour-spout is formed by a barrier molded into one side of the storage container and a drainback hole is interposed through the barrier. When the level of liquid in the measuring head exceeds a preselected amount, the excess liquid pours back into the storage container through the drainback hole, leaving the exact amount of liquid to be dispensed from the measuring head.

4 Claims, 2 Drawing Sheets

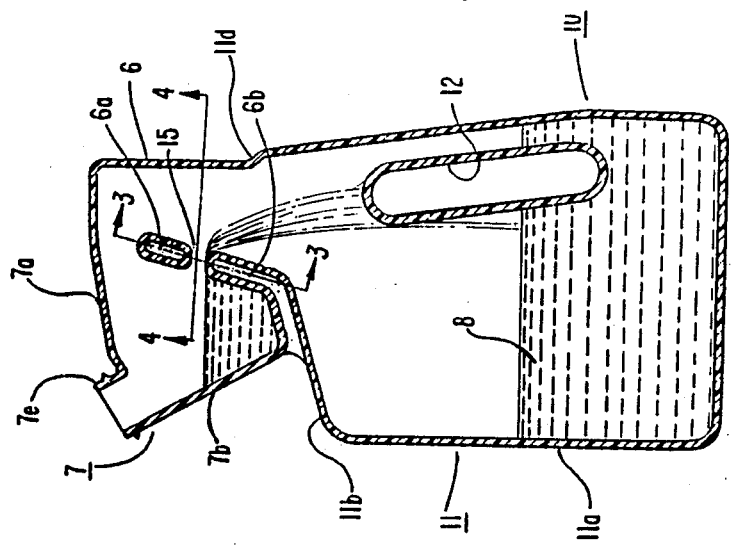
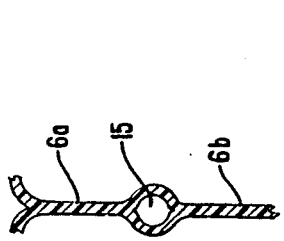
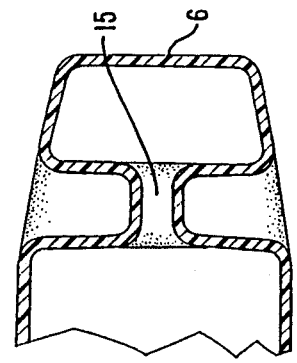
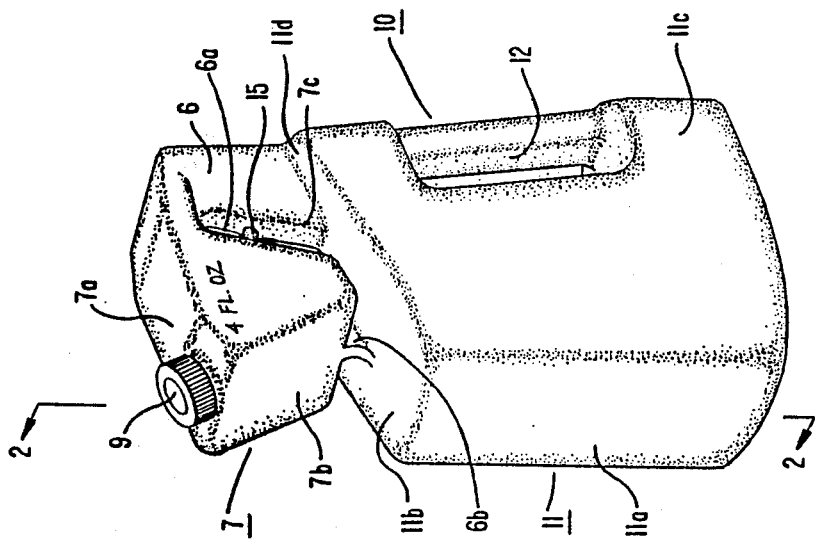

EXACT VOLUME DISPENSING CONTAINER

BACKGROUND OF THE INVENTION

This relates to measuring containers of the type having a measuring head, a storage container and a modified pour-spout which serves to accurately measure discrete amounts of liquid poured out from the pour-spout.

Such measuring devices were disclosed and claimed in my prior U.S. Pat. Nos. 4,079,859, issued Mar. 21, 1978, 4,298,038, issued Nov. 3, 1981, and 4,646,948, issued Mar. 3, 1987.

The measuring devices of the designs disclosed in the foregoing patents function to measure a range of volumes of stored fluid by a procedure in which the measuring head is filled from the storage container, and by use of a scale on the measuring head, the user can determine the proper amount of fluid to be dispensed. The vessel is then tilted back, causing the excess fluid in the measuring head to be returned to the storage container.

In the practice of using measuring devices of the type described, it is often necessary to dispense a preselected measured volume of fluid ounces.

Accordingly, it is the principal object of this invention to improve and simplify measuring devices of the type described for repeatedly dispensing a discrete measured amount of fluid.

This and other objects are achieved in a measuring vessel having a storage container, a measuring head, a pour-out spout, and a modified pour-spout in which a passage or opening at a preselected position in the wall between the measuring head and the modified pour-spout acts as an automatic drainback from the measuring head. Thus, during the measuring operation, the container is tilted to overfill the measuring head, and then returned to an upright position. Drainback of fluid from the measuring head into the storage vessel occurs until the exact level is achieved in the measuring head which will correspond to the exact volume each selected container is designed to dispense through its pour-out spout. It is contemplated that one may have a series of containers, each of which is designed to dispense a preselected measured volume of fluid.

In each case, an opening or passage, in accordance with the present invention, is molded into the plastic wall between the measuring vessel and the modified pour-spout at a preselected position to cause drainback from the measuring vessel when the fluid level in the latter reaches the exact measured amount which the vessel was designed to dispense. The vessel is then tipped forward, and the measured quantity of liquid is dispensed from the measuring head through the regular pour-out spout in the manner of containers disclosed in my prior patents supra.

One of the embodiments shown by way of illustration includes a handle molded into the body of the primary container.

Another embodiment, which excludes the handle, includes a filler opening vertically aligned with the modified pour-spout, which is closed by a snap-on closure when the initial filling process has been completed.

The device of the present invention has the advantage of greatly simplifying the step of repeatedly dispensing a preselected, premeasured volume of liquid, eliminating the necessity for visual measurement of the amount dispensed or poured back into the measuring head at each dispensing step.

This, and other objects, features and advantages of the present invention will be better understood from a study of the detailed description of the invention hereinafter with reference to the attached drawings.

SHORT DESCRIPTION OF THE DRAWINGS

FIG. 1 is a perspective showing of a vessel in accordance with the present invention having a measuring head, pour-out spout, storage container, modified pour-spout and a molded-in handle, which vessel is designed to dispense discrete preselected amounts of fluid through its pour-out spout.

FIG. 2 is a sectional showing of the vessel of FIG. 1, along a vertical plane indicated by the arrows 2—2 of FIG. 1.

FIG. 3 is a sectional showing of a fragment including the drainback opening, through the plane indicated by the arrows 3—3 of FIG. 2.

FIG. 4 is a sectional showing of a fragment including showing the drainback opening, through a plane indicated by the arrows 4—4 of FIG. 3.

DETAILED DESCRIPTION OF THE INVENTION

Figure 6:
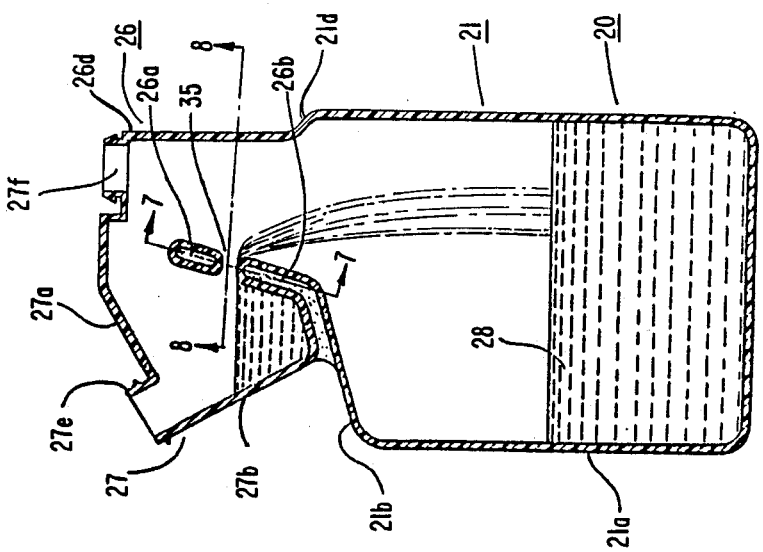
FIG. 6 is a sectional showing along a vertical plane indicated by the arrows 6—6 of FIG. 5.

Referring to FIGS. 1–4 as described above, the storage container 10 is formed from polypropylene, or similar semi-rigid plastic material, having a wall thickness of, say 3/64 inch (1 millimeter). In one embodiment, which is described by way of illustration, and which is designed to dispense an exact volume of 4 ounces, the storage container 10, has a substantially rectangular base, say, 6½ inches (16½ centimeters) long and, say, 3⅜ inches (8.7 centimeters) wide; and has an overall height of, for example, 11¼ inches (28½ centimeters). It will be apparent that the dimensions of each container may depend on the exact volume it is designed to dispense, and other features, including the particular shape of the design, which is optional.

In the embodiment under description the base portion supports a substantially rectangular, primary container 11, about 8 inches (20.5 centimeters) high, say, 2¼ inches (6 centimeters) across the rear end, the top sloping down at a slight angle toward the front end, to a width of, say, 2½ inches (6 centimeters). The primary container 11 is rounded on the corners, having a fluid capacity of, say, 64 fluid ounces. Primary container 11 is substantially rectangular in form. The rear wall 11c is crimped inwardly at the top of primary container 11, forming a shoulder 11d from which the rear wall projects up vertically to form the hollow pipe 6 which is designated as the modified pour-spout. The latter communicates internally at its upper end with a hollow measuring vessel 7 having a truncated triangular lateral section, 2½ inches (5½ centimeters) wide across the front, which extends, say 3½ inches (9 centimeters) across the top of the container and narrows down at a plane 2¾ inches (7½ centimeters) below the top to form a cup having an inner width, say, 1⅛ inches (2.5 centimeters) which is molded to the top front shoulder 11b of the primary container 11.

The upper end of measuring vessel 7, opposite the modified pour-spout 6, terminates in the actual pourout spout 7e having an internal diameter of, say, ⅞ inch (2.2 centimeters).

Molded into the body of the embodiment under description, near the top of the primary container 11, substantially parallel to its rear wall 11c, is a vertically elongated recessed, substantially elliptical handle opening 12, which extends parallel to and about ¾ inch (2 centimeters) in from the rear wall 11c, from a level about 2½ inches (6½ centimeters) above the container bottom to a level about 1½ inches (4 centimeters) below the rear shoulder 11d, the shape and dimensions being varied to facilitate grasping.

A particular feature of the embodiment disclosed in FIGS. 1-4 is that the modified pour-spout 6 is formed by compression-molding the rear portion of the measuring head 7, in the area opposite the primary pour-out spout 7e. The modified pour-spout 6 is thus separated from the inside of the measuring head 7 by the molded barrier indentation 6a, about 3/16 inch (½ centimeter) wide and ½ inch (1 centimeter) deep. This runs downward and inward about 2¼ inches (6 centimeters) forming an angle of about 15 degrees with the principal axis of the container. This not only forms one wall of the tube 6, but is bent inwardly at the bottom at an angle slightly exceeding a right angle to form a barrier 6b which forms the bottom of the cup separating the measuring head 7 from the primary storage container 11 in the neck portion resting on top of the shoulder 11b of the primary container 11.

The front end 11a of container 11 comprises a substantially straight wall which rises from the base, to a height of, say, 7 inches (19 centimeters). This curves inward and upward, forming the shoulder 11b which forms a small angle with the horizontal, and extends inwardly for, say, about 2 inches (5 centimeters) to the inwardly-curved neck formed by the barrier 6b.

From the neck 6b, the pour-out spout 7e extends upward and outward a total distance of about 3 inches (8 centimeters), forming an angle of, say, 75 degrees with shoulder 11b, terminating in a screw-threaded spout having a cap 9.

The modified pour-spout 6, which is, say, about 1 inch (2.54 centimeters) in inner diameter at the upper end, extends upward about 2½ inches (6 centimeters) in an outwardly-angled direction from the top of the primary storage container 11, opposite the direction of pour-out spout 7e.

The closed flat top portion 7a, which is, say, 2 inches (5.2 centimeters) in overall width, extends across 4 inches (10 centimeters) from tangential contact with the inner periphery of pour-out spout 7e.

A particular feature of this embodiment is the drainback opening 15, which may be, for example, a round opening ¼ inch (½ centimeter) in diameter, in the barrier layer 6a. The location of the opening 15 in the barrier layer 6a will depend on the measuring level for which a specific container is designed to pour out. For example, if the container is designed to repeatedly pour out an exact measurement of four ounces, then the opening 15 is so located that when the measuring head 7 is filled with 4 fluid ounces, an excess over 4 ounces will pour back into container 11 through the opening 15. It is contemplated that a user might be equipped with a series of such containers, each designed to pour out a different exact measured volume, and each appropriately marked with an indication of the volume to be dispensed on the face of the measuring vessel 7.

For measuring out the preselected amount of fluid for which the container is designed, the container 10 is tilted to overfill the measuring head 7, and then returned to an upright position. Drainback occurs until the exact level is achieved for which the container is designed.

Another modified form of the exact volume container in accordance with the present invention is disclosed in FIGS. 5, 6, 7 and 8. In this embodiment, which is designed in the presently described instance to dispense an exact volume of 2 ounces, the handle has been omitted. As an alternative to the container previously described, this container 20 is designed to be filled through a special filler opening in the top, in addition to the opening in the pour-out spout, in a manner described in detail in my U.S. Pat. No. 4,298,038, issued Nov. 3, 1981.

A feature of this embodiment, as in the case of the embodiment described in FIGS. 1-4 hereinbefore, is that the modified pour-spout 26 is formed by compression-molding the rear portion of the measuring head 27, in the area opposite the primary pour-out spout 27e. The modified pour-spout 26 is thus separated from the inside of the measuring head 27 by the molded barrier 26a in the manner described with reference to FIGS. 1-4, which barrier not only forms one wall of the modified pour-spout, but is bent inwardly at substantially a right angle to form a barrier 26b between the cup formed by the measuring head 27 and the primary storage container 21 in the neck portion 29. The presently described embodiment 20 is, for example, say, 9 inches (23 centimeters) in overall height, and say, 2½ inches (6½ centimeters) across the front and rear ends, and 4 inches (10½ centimeters) wide on the sides, the primary storage container 21a being substantially flat on its sides and ends, and rounded on the corners.

The front end 21a of primary container 21 comprises a substantially straight wall which rises from the base, to a height of, say, 5 inches (13 centimeters) from front to back, forming a front shoulder 21b which is angled inwardly and upwardly 4 inches (10½ centimeters) making an angle of, say, 12 degrees with the horizontal.

The rear end 21c of primary container 21, opposite the pour-out spout 27e, is substantially straight, extending to a height of about 6 inches (15 centimeters) above the base, not including the modified pour tube 26, which is, say, about ¾ inch (2 centimeters) in inner diameter and extends upward about 3 inches (8 centimeters) from the top of the primary storage container 21.

The measuring head 17, substantially similar to measuring head 7 previously described, is substantially frusto-triangular in lateral section forming a cup which rests on the upper surface of the top of primary storage container 21, the outer end surface 27b forming an outwardly-directed angle of, say, 32 degrees with the principal axis of the container 20; and the inner surface comprising barrier 26a, forming an oppositelydirected smaller angle of, say, 15 degrees, with the principal axis of the container 20. Side 27b of measuring head 27 extends upward and outward, say, 2½ inches (6 centimeters), forming a shoulder 27c at its upper end from which the screw-threaded pour-out spout 27e projects. The latter is, say, ⅜ inch (3.4 centimeters) in inner diameter, and is closed with a conventional screw cap 29.

A particular feature of this embodiment is a filler opening 27f, say, about 1 inch (2.54 centimeters) in inner diameter, which is located adjacent the rear wall 26d of the modified pour-spout 26. The filler opening 27f serves to accommodate a filler tube during the initial period when the container 20 is being filled with fluid. At the end of this period, the tube is removed from 27f, and the opening is sealed with a snap-on cap 28 of the type shown in FIG. 5. The pour-out spout 27e is connected to the filler opening 27f, by the flat closed top 27a, which extends, say, 2 inches (6 centimeters) across from the tangent to the pour-out opening 27e to the tangent of filler opening 27f.

As with the embodiment described with reference to FIGS. 1 et seq., this embodiment of FIGS. 5–8 is designed to dispense an exact volume of liquid from the measuring head 27, in this case, four fluid ounces.

Figure 7:
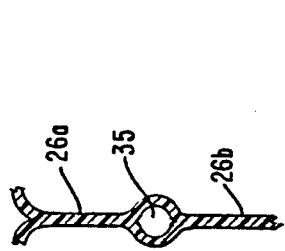
FIG. 7 is a sectional showing of a fragment including the drainback opening through a plane indicated by the arrows 7—7 of FIG. 5.
Figure 8:
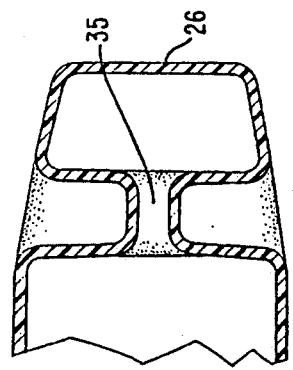
FIG. 8 is a sectional showing of a fragment, including the drainback opening through a plane indicated by the arrows 8—8 of FIG. 5.
Figure 5:
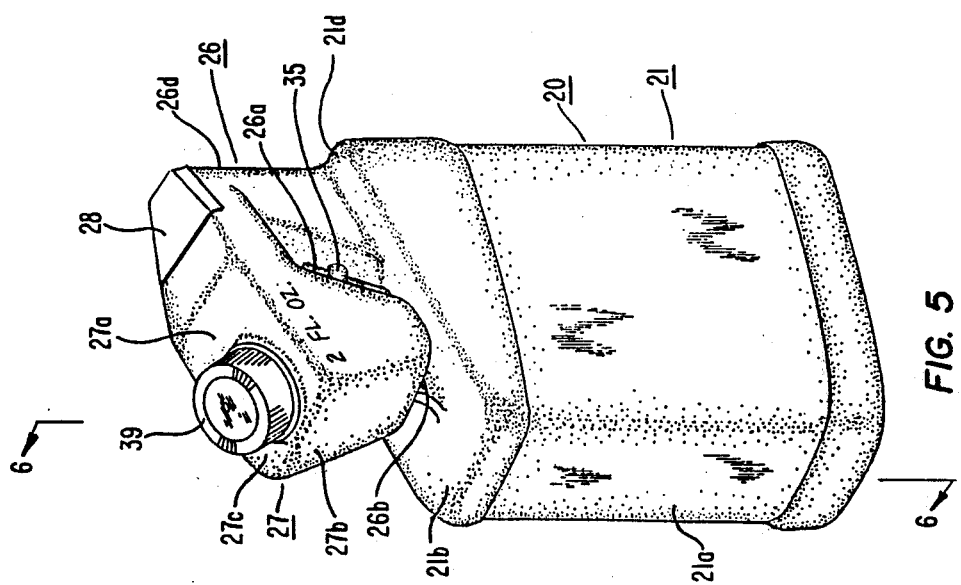
FIG. 5 is a modification of the vessel of the present invention without a molded-in handle, having a measuring head with a pour-out spout, a storage container and modified pour-spout with a filler opening having a snap-on closure.

To achieve this, a cylindrical drainback opening 35, say, ¼ inch (½ centimeter) in inner diameter and extending ¼ inch (½ centimeter) in a thickness direction, as shown in FIGS. 6, 7 and 8, is interposed through the barrier layer 26a, so as to communicate between the measuring head 27 and the modified pourspout 26. The drainback opening 35 is located at the exact level so that when the measuring head 27 is filled with 4 fluid ounces of liquid, the excess liquid pours back in the primary storage container 21. Thus, when container 20 is tipped forward in the direction of pour-out spout 27e, exactly 4 fluid ounces of liquid is dispensed.

It will be understood that the present invention is not limited to containers of the specific forms or dimensions disclosed herein by way of illustration, but only by the scope of the appended claims.

What I claim is:

1. In a dispensing container, comprising: a primary storage container for storing liquid and a measuring head having a pour-out spout with a removable closure disposed above said primary storage container, a neck disposed between said primary storage container and the base of said measuring head, a modified pour-spout at the side of said measuring head, said modified pour-spout comprising a tube formed by a barrier connected at its lower end at said neck, said barrier being spaced-apart from said pour-out spout whereby said tube receives liquid from said storage container and transports said liquid to said measuring head through a passage at the upper end of said tube adjacent the side of said measuring head opposite to said pour-out spout for measuring said liquid when said container is first tilted and then righted and dispensing said liquid from said measuring head through said pour-out spout when said closure is removed and said container is again tilted, the improvement wherein:

a drainback opening is interposed through said barrier for connecting the interior of said measuring head to the interior of said tube at a level below the upper end of said tube for draining liquid above a preselected level stored in said measuring head back through said drainback opening into said primary storage container, whereby the level of liquid to be dispensed from said measuring head is equal to the exact volume stored in said measuring head.

2. The dispensing container of claim 1 including a handle molded into the body of said primary storage container.

3. The dispensing container of claim 1 comprising a filler opening vertically aligned with said modified pour-spout; and means comprising a snap-on cap for closing said filler opening.

4. A dispensing container, comprising: a primary storage container for storing liquid; a measuring vessel disposed above and separated by a neck from said primary storage container and having a pour-out spout with a removable closure; a modified pour-spout comprising a hollow conduit formed by a barrier extending from said neck, adjacent one side of said measuring vessel and communicating with said measuring vessel at its upper end by a passage, said measuring vessel receiving liquid from said primary storage container through said hollow conduit when the dispensing container is tilted, and holding a measured amount of liquid therein when the container is righted, and then dispensing said measured amount of liquid through said pour-spout upon removal of the closure and tilting of the dispensing container; the improvement comprising:

a drainback opening interposed through said barrier between said measuring vessel and said hollow conduit, below said passage and above said neck for draining liquid above a preselected level stored in said measuring vessel, as defined by said drainback opening, back into said primary storage container, whereby the level of liquid to be dispensed from said measuring vessel is equal to the exact volume stored in said measuring vessel.

* * * * *